(12) United States Patent
Oberndorfer

(10) Patent No.: US 6,865,760 B2
(45) Date of Patent: Mar. 15, 2005

(54) TOOL HOLDER AND CORD LOCKING MEANS

(76) Inventor: Michael J. Oberndorfer, 2360 Ashwood Pl., Paso Robles, CA (US) 93446

( * ) Notice: Subject to any disclaimer, the term of this patent is extended or adjusted under 35 U.S.C. 154(b) by 0 days.

(21) Appl. No.: 10/622,875

(22) Filed: Jul. 18, 2003

(65) Prior Publication Data

US 2005/0011011 A1 Jan. 20, 2005

(51) Int. Cl.[7] ................................. B25B 7/22
(52) U.S. Cl. ................................. 7/138; 7/165
(58) Field of Search ........................... 7/118, 138, 165, 7/167, 168; 81/16; 279/147, 149, 150

(56) References Cited

U.S. PATENT DOCUMENTS

| 281,646 A | 7/1883 | Sturdy |
| D86,179 S | 2/1932 | Pelouch et al. |
| 1,932,011 A | 10/1933 | Beegle |
| 3,911,762 A | 10/1975 | Mackal |
| 4,175,298 A | 11/1979 | Muller et al. |
| 4,578,835 A | 4/1986 | Pichler et al. |
| 4,776,094 A | 10/1988 | Glesser |
| 5,237,715 A | 8/1993 | Bane, III |
| 5,237,722 A | 8/1993 | Ott |
| 5,553,340 A | 9/1996 | Brown, Jr. |
| 6,170,361 B1 | 1/2001 | Yates |

FOREIGN PATENT DOCUMENTS

WO     WO/84/01318     4/1984

Primary Examiner—James G. Smith
(74) Attorney, Agent, or Firm—Thomas F. Lebens; Sinsheimer, Schiebelhut & Baggett

(57) ABSTRACT

A tool holder containing at least one service tool for servicing a power-operated device. The tool holder is permanently attached to a retractable pull cord incorporated into a manual starter of a power-operated device. The service tool or tools are pivotally mounted on the tool holder, allowing the service tool or tools to be folded out for servicing the power operated device and subsequently folded in and stowed compactly within the main body of the tool holder. The tool holder may include a mechanism for reducing the recoil of the manual starter. A cord locking means secures the retractable pull cord of the manual starter in a retracted state. The cord locking means affords a range of mobility to the tool holder, permitting the tool holder and service tools thereon to be easily used to service a power-operated device.

29 Claims, 11 Drawing Sheets

TOOL HOLDER AND CORD LOCKING MEANS

BACKGROUND OF THE INVENTION

1. Field of the Invention

The present invention relates generally to a tool holder. More specifically the present invention relates to a pull handle of a power operated device incorporating a tool holder having at least one service tool permanently attached. The pull handle is permanently coupled to the pull cord. Also described is a means for locking the pull cord in a retracted state.

2. Discussion of the Related Art

Power operated devices often require maintenance that necessitates the use of service tools. This maintenance can include cleaning, tightening, and sharpening components of the device, or removing and attaching parts and accessories of the device. To this end, there exists a plethora of service tools and several ways of holding service tools so that they are readily available once such servicing is required. The operator of a powered device may carry individual service tools, but depending on their shape and size it may be cumbersome and/or dangerous for the operator to carry the individual service tools while using the power-operated device.

An attempt to remedy these problems has been made by Pichler et al. in U.S. Pat. No. 4,578,835 incorporated herein by reference. The '835 patent demonstrates a tool carrier formed as an essential component necessary to operate a power operated device. The tool carrier must be detached from a power-operated device in order to effectively use the service tools that are permanently attached to the tool carrier. Pichler et al. contend that, as an essential operating component of the power operated device, a removable tool carrier fashioned as described above makes misplacing the tool carrier practically impossible. However, the '835 patent does not successfully solve the problem associated with a service tool's vulnerability to being misplaced. For instance, it is not unforeseeable that under certain circumstances, once removed for the purpose of servicing a power operated device, the tool carrier of the '835 patent may be misplaced, forgotten, or dropped in an area from which it may not be easily retrieved. Further, due to the functional relation of the tool carrier of the '835 patent to the power-operated device, misplacement of this tool carrier would create an additional undesirable consequence of rendering the power-operated device inoperable.

Presently there is, by way of example, need for an apparatus, such as that taught in the present invention, which effectively addresses and solves the aforementioned shortcomings and others. Specifically, an apparatus is needed that can conveniently store service tools for a power operated device while affording safe and unburdening operation of that power operated device. Moreover, it is essential to eliminate the service tool's susceptibility to being lost, which may be caused by the circumstances of the service tools use.

SUMMARY OF THE INVENTION

The present invention is directed toward a tool holder containing at least one service tool for servicing a power-operated device.

In accordance with one embodiment, the tool holder is permanently attached to a retractable pull cord incorporated into a manual starter of a power-operated device. The service tool or tools are pivotally mounted on the tool holder, allowing the service tool or tools to be folded out for servicing a power operated device and subsequently folded in and stowed compactly within the main body of the tool holder. An additional aspect of the present embodiment is a mechanism integrated into the tool holder for reducing the recoil of a manual starter.

According to further embodiments of the present invention, a cord locking means is described for securing the retractable pull cord of the manual starter in an extended state. The cord locking means affords a range of mobility to the tool holder, permitting the tool holder and service tools thereon to be easily used to service a power-operated device, while at the same time remaining tethered to the power operated devices by the retractable pull cord.

BRIEF DESCRIPTION OF THE DRAWINGS

The abovementioned and other aspects and features of the present invention in various embodiments will become apparent, and will be best understood by reference to the following descriptions of embodiments in conjunction with the figures attached hereto, wherein.

DETAILED DESCRIPTION

The forthcoming description sets forth various embodiments envisioned for practicing the present invention. This description is not to be taken in a limiting sense, but is made for the purpose of illustrating the general tenants of the invention. To ascertain the scope of the invention, one should reference the issued claims.

The present invention remedies the problems associated with the prior art by incorporating a service tool or tools into a standard operating component of a power-operated device, and further by selecting a component that is permanently coupled to the power-operated device. Subsequently, a further aspect of the invention provides mobility for the fixed component to which the service tool or tools are integrated. Providing mobility for the fixed component allows practical use of the service tool or tools while preserving their permanence to the power operated device, virtually eliminating any of the service tool's vulnerability to being misplaced.

Figure 1:
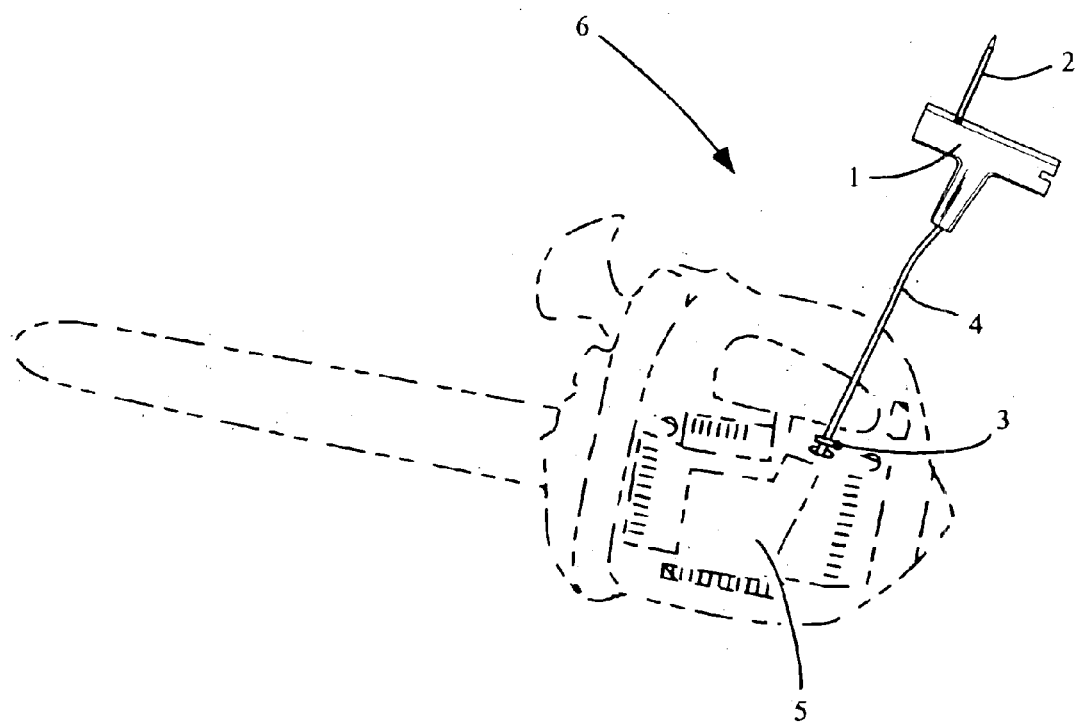
FIG. 1 is a drawing illustrating a service tool, tool holder, and cord locking means in relation to a power-operated device, which is shown in silhouette.

Looking now to the figures attached hereto, features and embodiments are now further described in detail. Turning first to FIG. 1, an embodiment of a tool holder 1 of the present invention is shown with respect to a chain saw 6, as an example of a power-operated device in relation to the present invention. Specifically, FIG. 1 illustrates a tool holder 1, a folding service tool 2, cord locking means 3, pull cord 4, manual starter 5 and chain saw 6. It is important to note that the chain saw 6 depicted is only an example of a power-operated device, and an embodiment of the present invention may be incorporated into the manual starter 5 of any power-operated device including, but not limited to, lawn mowers, weedwackers, hedgers, blowers, and tree trimmers. The manual starter 5 of the chain saw 6 incorporates a pull cord 4. Those skilled in the art are aware that a manual starter 5 will typically further comprise a rewind mechanism coupled to the pull cord 4 and a clutch assembly for engaging a flywheel of the chain saw's 6 engine, whereby pulling the pull cord 4 turns the engine crank shaft and starts the chain saw 6.

In accordance with one functional aspect of the present invention, the tool holder 1 is shaped as pull handle and is permanently coupled to the pull cord 4, allowing an operator to utilize the tool holder 1 to retract the pull cord 4 and subsequently start the chain saw 6 for operation. FIG. 1 depicts a cord locking means 3, opposing the wind back force applied to the pull cord 4 by the rewind mechanism of the manual starter 5. Consequently, the pull cord 4 is locked in a retracted state. With the pull cord 4 locked in a retracted state as shown, an operator may use the service tool 2 to service the chain saw 6.

Figure 2:
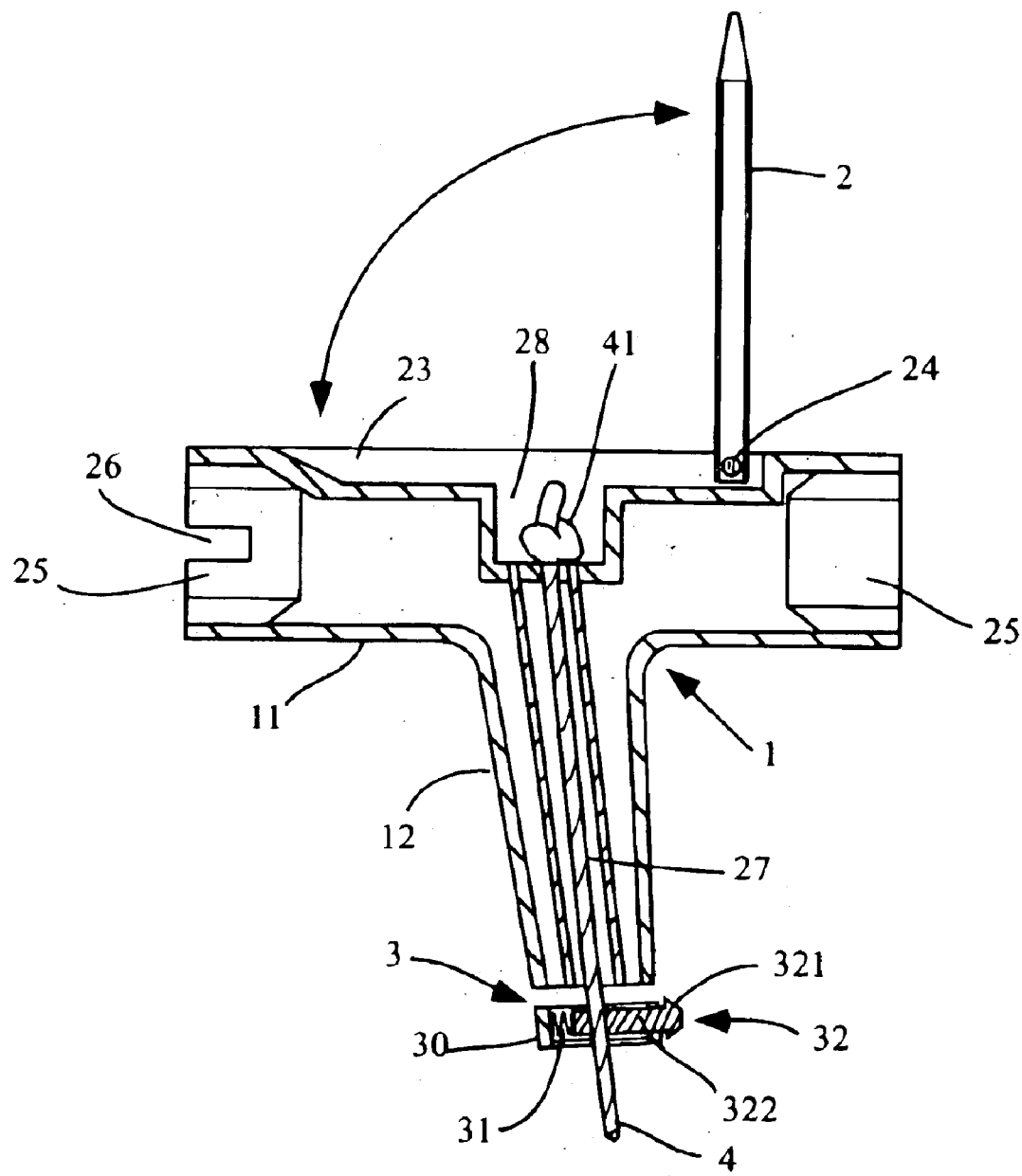
FIG. 2 is an illustration depicting the tool holder of FIG. 1 shown in front perspective and in cross section, wherein the tool holder has a folding service tool demonstrated as a screwdriver, and both ends of the tool holder are molded to form socket wrenches, and wherein a cord locking means comprised of a spring and piston assembly.

Focusing now on FIG. 2, greater insight is gained into a tool holder 1 and cord locking means 3 of the present embodiment. Depicted are a tool holder 1 having a handle 11 and shaft 12 segment, a folding service tool 2, a service tool-shaped cavity 23, a pivot axis 24, socket-shaped cavities 25, a notch 26, a conduit 27, and a chamber 28. Further, a cord locking means 3 comprised of a hollow cylinder 30, a coil spring 31, and a piston 32 having a head 321 and shaft 322 are shown. Also shown are a pull cord 4 and coupling means 41. The service tool 2 is permanently attached to the tool holder 1 by the pivot axis 24. The pivot axis 24 permits the service tool 2 to fold out, as illustrated, to perform service functions and to fold into the service tool-shaped cavity 23 when it is not in use. Both distal ends of the tool holder handle segment 11 have socket shaped cavities 25 which may be used to loosen or tighten a sparkplug, nuts, bolts, and other components of a power-operated device. Additionally, a distal end of the handle segmental has a notch 26 that may help facilitate the loosening and tightening of wing nuts, for example, or the cap of a fuel can. The tool holder shaft 12 has a conduit 27 allowing the pull cord 4 to pass into the chamber 28 where a coupling means 41 at the end of the pull cord 4 is housed. In the embodiment depicted, the coupling means 41 is a knot, permanently coupling the pull cord 4 and the tool holder 1. Those skilled in the art will know that various other means useful for coupling the tool holder 1 and pull cord 4, such as various types of glue, may be used by this or alternative embodiments of the present invention.

Cord locking means 3 is comprised of a hollow cylinder 30, which houses a coil spring 31 and the shaft of a piston 322. The hollow cylinder 30 has two opposing holes, roughly the circumference of the pull cord 4, aligned on its surface. Additionally, a portion of the piston shaft 322 has a conduit through its midsection, having roughly the circumference of the pull cord 4. These holes in the surface of the hollow cylinder 30 in conjunction with the conduit through the piston shaft 322, allow the pull cord 4 to run through the cord locking means 3.

Coil spring 31 is positioned between the closed end of the hollow cylinder 30 and the end of the piston shaft 322, whereby it exerts a moving force on the piston 32. In the embodiment of the cord locking means 3 shown in FIG. 2, in steady state the coil spring 31 exerts a lateral force on the end of the piston shaft 322 causing misalignment of the openings to the conduit in the piston shaft 322 and the holes in the hollow cylinder 30. Consequently, a pinching force is applied to the section of the pull cord 4 that runs through the conduit in the piston shaft 322. As result, the pull cord 4 is prevented from sliding through the cord locking means 3, and the cord locking means 3 is fixed to a section of the pull cord 4. In an alternative embodiment, as described herein below, the coil spring 31 may be fixed to the end of the piston shaft 322, whereby it exerts a rotating force on the end of the piston shaft 322 causing misalignment of the openings to the conduit in the piston shaft 322 and the holes in the hollow cylinder 30.

By depressing the piston head 321 and aligning the holes in the hollow cylinder 30 with the openings of the piston shaft's 322 conduit, as shown in FIG. 2, the pull cord 4 is allowed to pass freely through the cord locking means 3. An operator may effectively lock the pull cord 4 in a retracted state by depressing the piston head 321 and subsequently sliding the cord locking means 3 down the length of a retracted pull cord 4 proximate to the manual starter. Consequently, a rewind mechanism of the manual starter is prevented from drawing in the pull cord 4 by the cord locking means 3, and the tool holder 1 coupled to the pull cord 4 may be used to service a power operated device to which it is attached.

Figure 3:
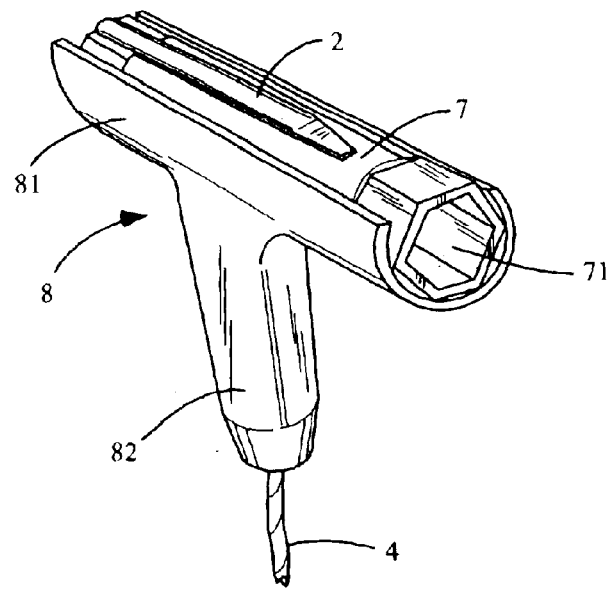
FIG. 3 is a diagram in side perspective showing the tool holder of FIG. 2 and a-folding service tool demonstrated as a screwdriver, wherein an end forms a socket wrench, wherein the tool holder is shown resting in a sheath, which is shaped similar to a pull handle.
Figures 4, 5:
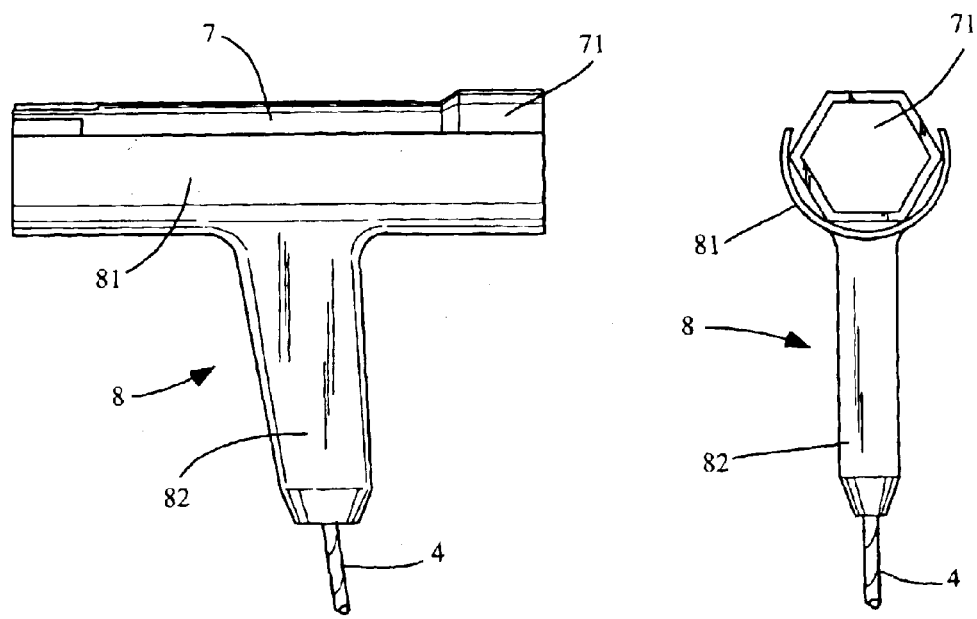
FIG. 4 is a drawing in front perspective-depicting the tool holder and sheath of FIG. 3.
FIG. 5 is an illustration in end perspective showing the tool holder and sheath of FIG. 3. The end of the tool holder formed as a socket wrench is shown.

Turning now to FIG. 3 through 5, side perspective, front perspective, and end perspective images are shown of an alternative embodiment of the present invention. Depicted is a tool holder 7 resting in a sheath 8, which is shaped similar to a pull handle. Detailed are the tool holder 7, a folding service tool 2, socket wrench shaped end 71 of the tool holder, the tool holder sheath 8 having receptacle 81 and shaft 82 segments, and pull cord 4. The tool holder 7 is cylindrical in shape, with an end formed as a socket wrench 71. The tool holder sheath 8 is roughly T-shaped, giving the present embodiment the characteristic shape of a starter cord pull handle. The sheath 8 is comprised of a vertically oriented shaft segment 82 connected to a horizontally oriented receptacle segment 81. The receptacle segment 81 is open, such that it has a cross section of approximately C-shape. As illustrated in FIG. 3 through 5, the receptacle 81 can receive the tool holder 7, whereby the tool holder 7 in combination with the sheath 8 can be used as a pull handle to facilitate starting a power-operated device. One skilled in the art will understand that the tool holder 7 of this and alternative embodiments and the sheath 8, may be composed of, but not limited to, various woods, fiberglass, polymers, metals, and composites. Furthermore, the exact dimensions of the tool holder 7 of this and alternative embodiments and the sheath 8, may vary in order to meet the specifications of a particular power-operated device.

Figure 6:
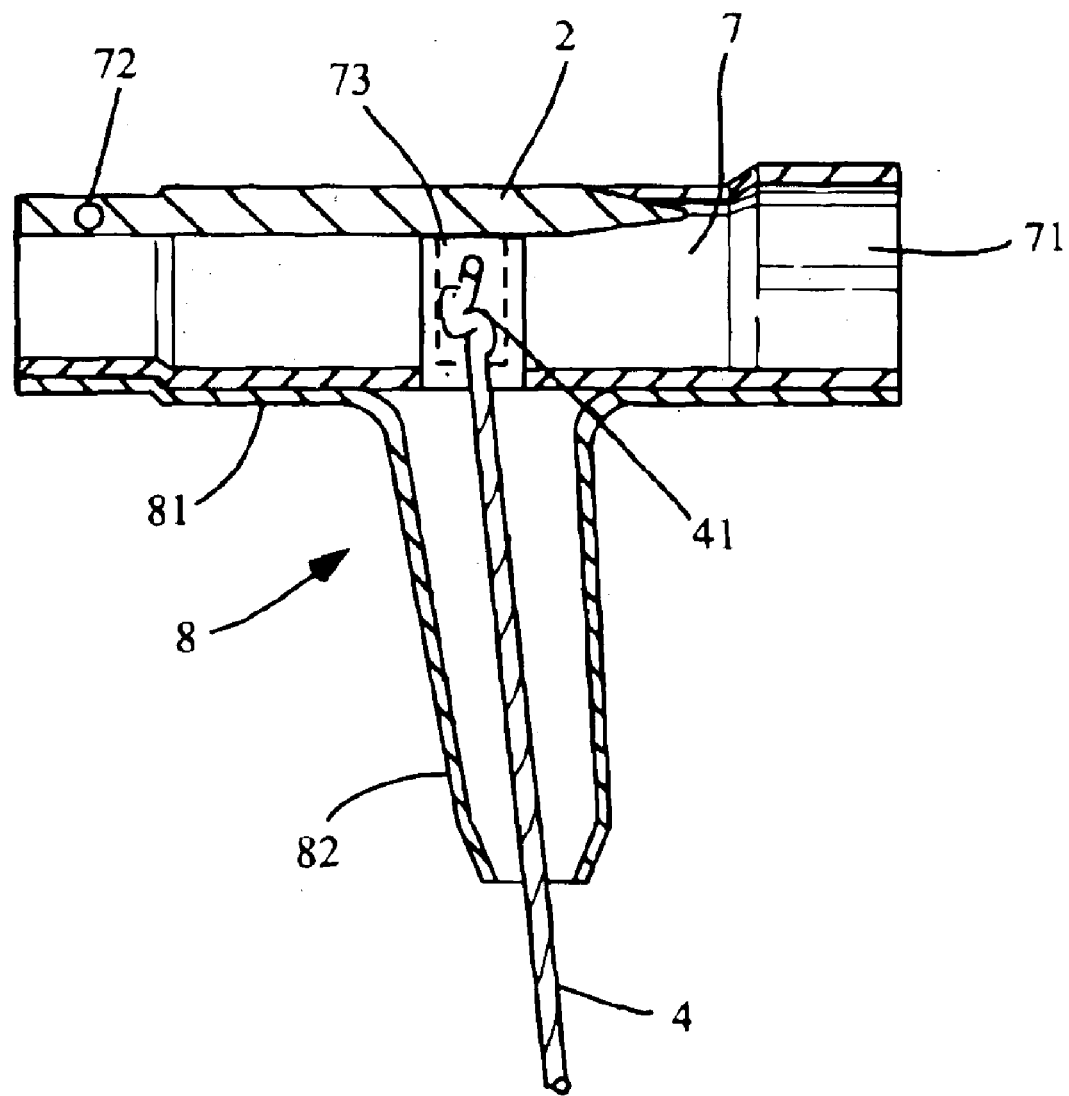
FIG. 6 is a drawing in front perspective and cross section, of the tool holder and sheath of FIG. 3.

Focusing now on FIG. 6, further insight is gained into the present embodiment of the invention comprised of a tool holder 7 and a sheath 8. Shown are the tool holder 7, a folding service tool 2, a socket-shaped cavity 71, a pivot axis 72, a chamber 73, the tool holder sheath 8 having a receptacle 81 and shaft 82 segments, a pull cord 4, and coupling means 41. Shaft segment 82 of the sheath 8 is hollow and open where it connects to the receptacle segment 81. The bottom of the shaft 82 is also open, which allows the pull cord 4 to pass through the shaft 82 to the tool holder 7, where a permanent connection is made between the tool holder 7 and the pull cord 4. The tool holder 7 has a chamber 73 for the purpose of housing a coupling means 41. The coupling means 41 may be, for example, a knot 41 at the end of pull cord 4 permanently coupling the pull cord 4 and the tool holder 7. The tool holder 7 has a socket-shaped cavity 71 formed in an end, which facilitates using the tool holder as a socket wrench.

In the embodiment represented in FIG. 6, folding service tool 2 is housed in the tool holder's 7 top surface and fixed thereto by the pivot axis 72. In FIG. 6 folding service tool 2 is a screwdriver. However, in this and alternative embodiments the folding service tool 2 could be any of a range other service tools including various wrenches, files, knives, feeler gauges, picks, and brushes, all of which may be of different size and type. Moreover, although the folding service tool 2 is shown housed in the top surface of the tool holder 7, it may be just as advantageous and conceivable to house a service tool 2 in the bottom surface of a tool holder 7. Additionally, in this and alternative embodiments, folding service tool 2 may be complimented by a plurality of folding service tools of different make, size, and type, for performing a variety of service functions on a power operated device.

Figures 7, 8:
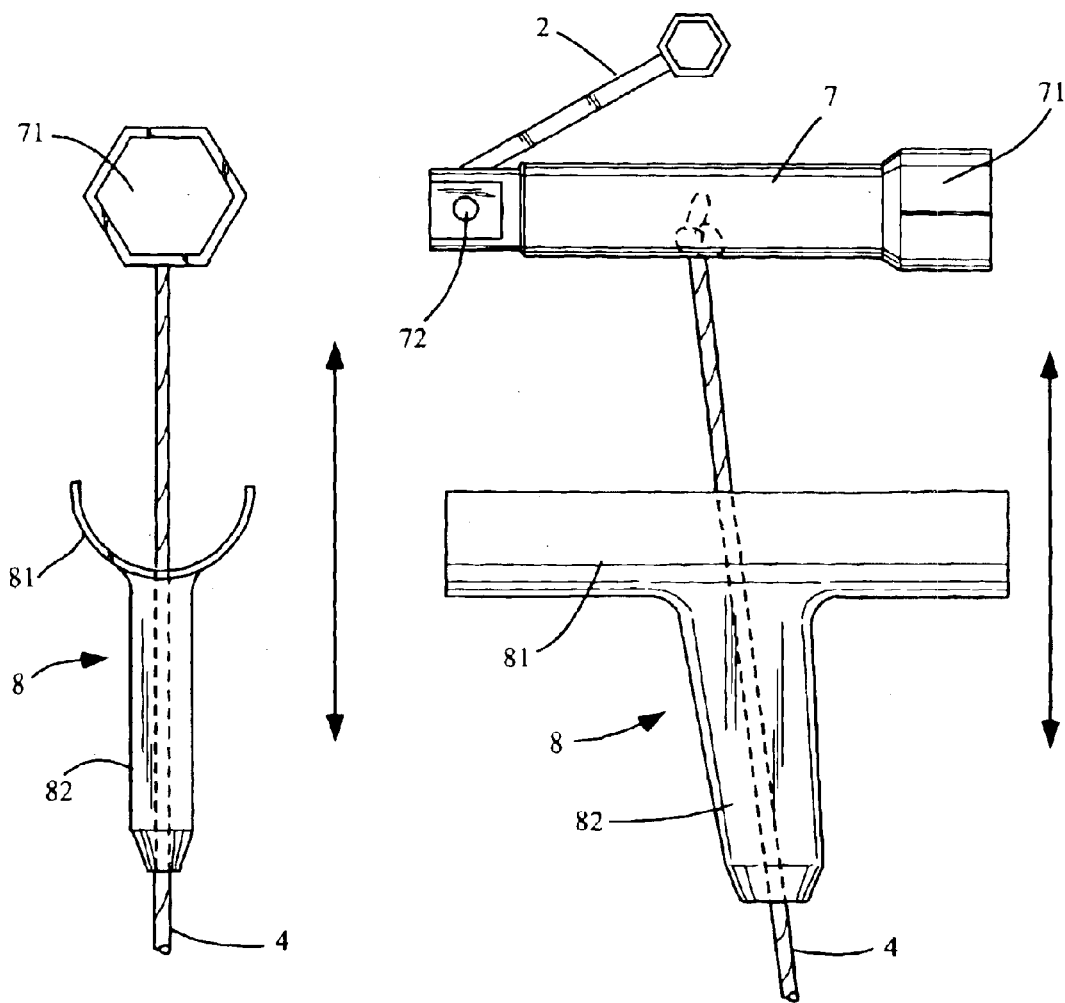
FIG. 7 is an illustration in end perspective showing a variation of the tool holder of FIG. 1 removed from a sheath, with the end of the tool holder formed as a socket wrench.
FIG. 8 is a diagram of the tool holder in FIG. 7 in front perspective, wherein the tool holder has a folding service tool, demonstrated as a socket wrench, shown folded out, wherein an end of the tool holder is molded to form a socket wrench, and wherein the tool holder is shown removed from a sheath that is shaped similar to a pull handle.

Looking now at FIGS. 7 and 8, a tool holder 7 of the present embodiment is shown removed from its sheath 8. Illustrated are tool holder 7, folding service tool 2, pivot axis 72, socket wrench shaped end 71 of the tool holder, the tool holder sheath 8 having a receptacle 81 and shaft 82 segments, and pull cord 4. The openings of the shaft 82 allows the sheath 8 to slide up and down the length of the pull cord 4 when the pull cord 4 is retracted, the reason for which will be described later in the application. Consequently, the tool holder 7 may be separated from the sheath 8 allowing the service tool 2 to be used to service a power-operated device.

The pivot axis 72 is mounted in an end of the tool holder 7 and has a service tool 2 pivotally attached. Pivot axis 72 permits the service tool 2 to fold-out, as illustrated in FIG. 8, to service a power-operated device and to fold into the tool holder 7 when the service tool 2 is not in use. One skilled in the art will know that various other hinging or pivotal embodiments, such as a small ball-and-socket assembly, can be used to permanently attach the service tool 2 to the tool holder 7 of this or alternative embodiments. Furthermore, it should be apparent that the pivot axis 72, or equivalent, is not restricted to being mounted in an end of the tool holder 7 and could, for example, be mounted in the center of the tool holder 7. Such a centered pivot axis placement may be advantageous for an embodiment having a plurality of service tools of shorter length.

Figure 9:
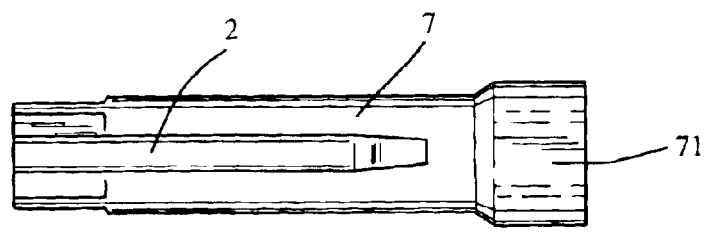
FIG. 9 is an illustration in top perspective of the tool holder of FIG. 8 having a service tool demonstrated as a screwdriver, wherein an end of the tool holder forms a socket wrench.
Figure 10:
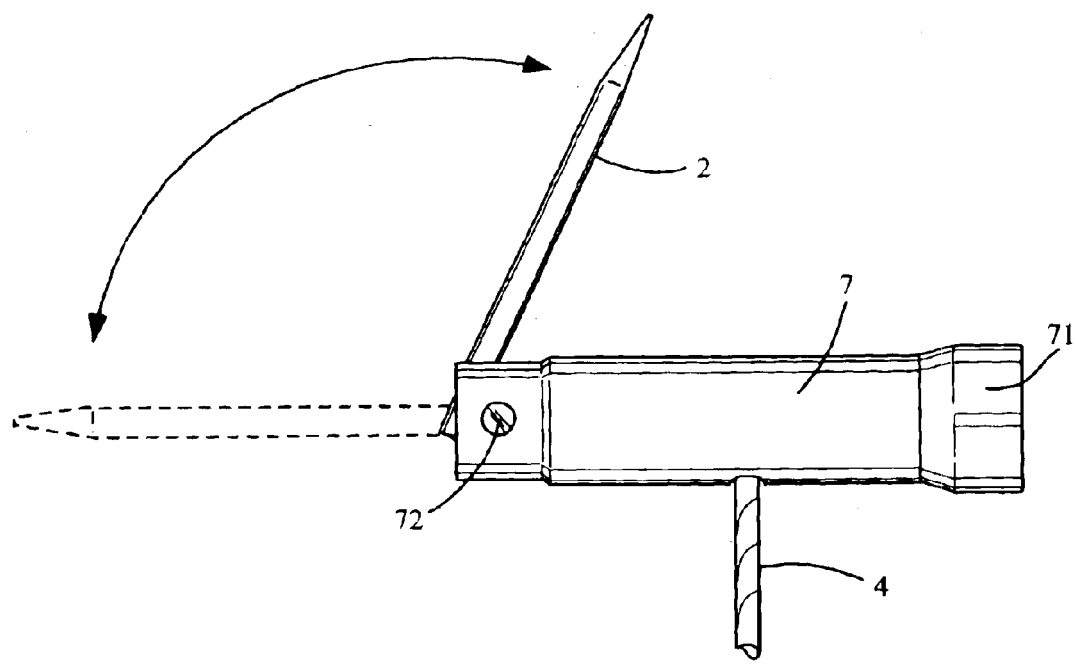
FIG. 10 is a depiction of the tool holder of FIG. 9 in front perspective having a service tool demonstrated as a screwdriver, which is folded out, wherein an end of the tool holder forms a socket wrench.

FIGS. 9 and 10 further illustrate a tool holder 7 of the present embodiment of the invention. Tool holder 7, a folding service tool 2, socket wrench shaped end 71 of the tool holder, a pivot axis 72, and pull cord 4, are shown. In the embodiment depicted in FIG. 9 the top surface of tool holder 7 has a holding cavity for housing service tool 2, which is roughly the shape and size of the service tool 2 pivotally attached thereto. In alternative embodiments of the tool holder 7, the holding cavity may be larger, whereby it does not conform to the size and shape of a particular service tool 2. This may be advantageous for standardizing the manufacturing of a tool holder 7 for different service tool types, or: required for embodiments having a plurality of service tools.

The socket wrench shaped end 71 of tool holder 7, may be used to loosen or tighten a sparkplug, nut, bolt, or other components of a power-operated device. An operator may unfold the service tool 2 and use it to provide leverage when using the socket shaped end 71 of the tool holder 7. One skilled in the art will understand that the socket wrench shaped end 71 may be of standard or metric unit and may be any of various socket sizes well known in the art. The size of the components on a power-operated device to be serviced, will likely dictate the size and unit to which the socket shaped end 71 conforms. Furthermore, in this and alternative embodiments, either or both ends of the tool holder 7 may be shaped as a particular size and unit of socket wrench, to aid in servicing different sized components of a power-operated device.

Figure 11:
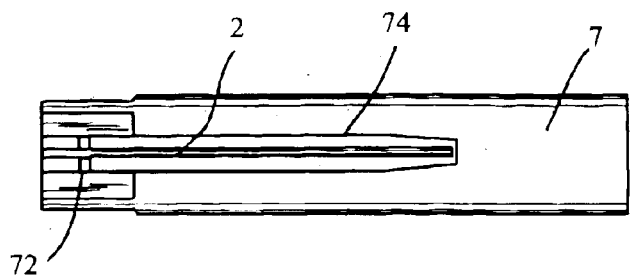
FIG. 11 is a diagram shown in top perspective, an alternative embodiment of the tool holder of FIG. 9 having a service tool demonstrated as a file.
Figure 12:
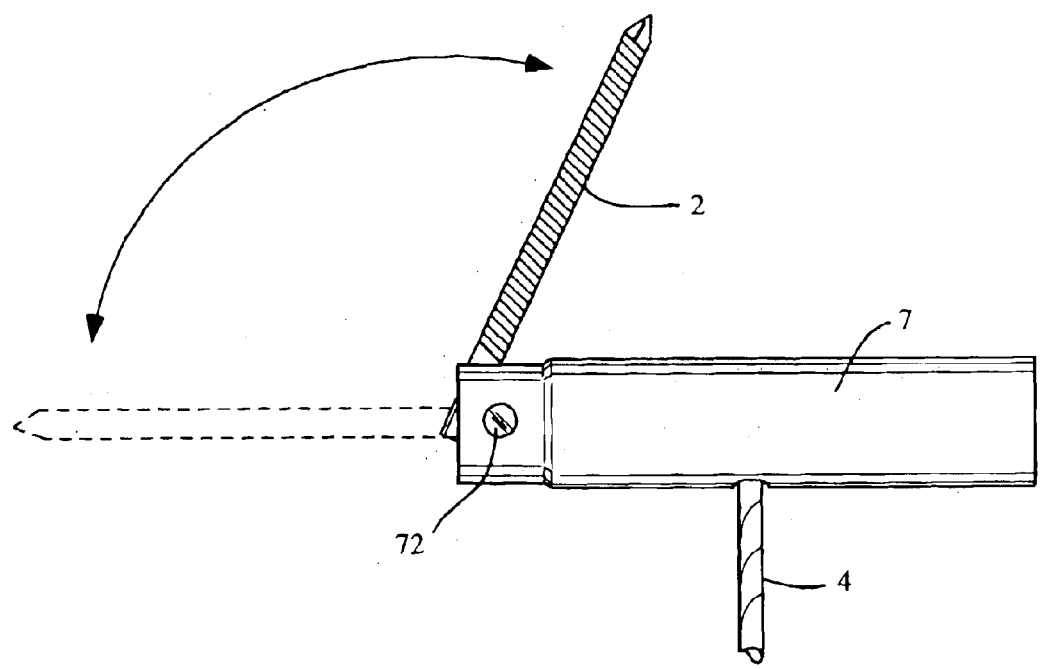
FIG. 12 is a depiction of the tool holder of FIG. 11 in front perspective, with the service tool folded out.
Figure 13:
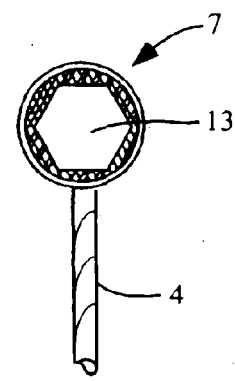
FIG. 13 is a drawing depicting the tool holder of FIG. 11 in end perspective, wherein the end shown has a cavity containing a socket wrench insert.

Focusing now on FIGS. 11 through 13, insight is gained regarding an alternative embodiment of a tool holder 7 of the present invention. Illustrated are the tool holder 7, a folding service tool 2, a holding cavity 74, a pivot axis 72, and a socket wrench insert 13. The service tool depicted in FIGS. 11 and 12 is a file. The holding cavity 74 for this service tool 2 in the tool holder's 7 top surface is roughly the shape and size of a larger alternative embodiment of a service tool 2, namely a screwdriver. Correspondingly, the pivot axis 72 is capable of being temporarily removed from the tool holder 7 whereby the service tool 2 mounted on the pivot axis 72 may also be removed and replaced by an alternative embodiment of service tool 2, such as a screwdriver. The tool holder 7 has a cavity formed in an end, which as illustrated in FIG. 13, can receive a socket wrench insert 13. This cavity in an end of the tool holder 7 is advantageous in that it facilitates the interchanging of socket wrench inserts 13 of different size and unit, as required to service various components of different size and unit on a power operated device.

Turning now to FIG. 14 through 19, cord locking means incorporated into a sheath of the present embodiment of the invention are described. The cord locking means serves to lock a pull cord in a retracted state so that a range of motion is granted to a tool holder of the present invention, allowing the tool holder to be used to service components of a power operated device.

Figure 14:
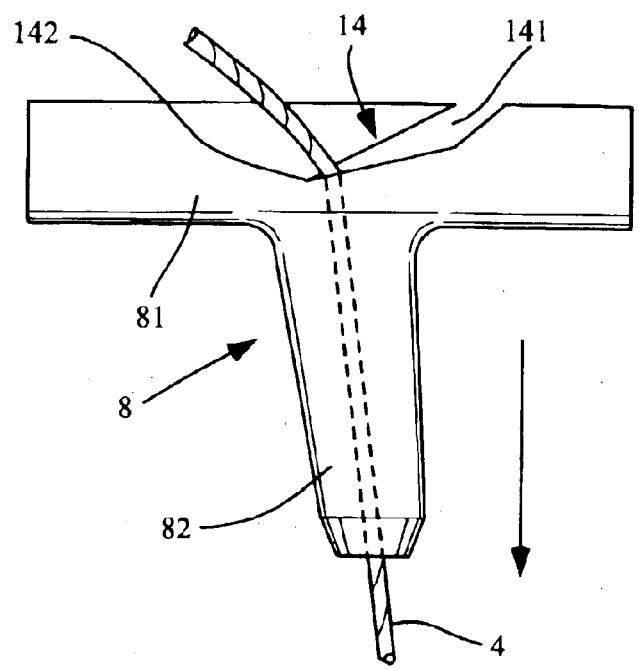
FIG. 14 is a drawing in front view, an embodiment of the tool holder sheath of the tool holder of FIG. 1, including a cord locking means comprising a V-shaped notch in the top edge of the tool holder sheath.

Looking first to FIG. 14, a V-notch cord lock embodiment 14 is illustrated. Shown are a tool holder sheath 8 having receptacle 81 and shaft 82 segments, V-notch 14 having an open 141 and tapered 142 end, and a pull cord 4. The V-notch 14 is in a top edge of tool holder sheath's receptacle 81. One skilled in the art will know that alternatively, the V-notch 14 may be in a side edge of tool holder sheath's receptacle 81 segment. The V-notch 14 is characterized by an opening 141 in one end, which tapers to converge to a single point at an opposite end 142. An operator will utilize the V-notch 14 by retracting the pull cord 4, sliding the sheath 8 down the length of the pull cord 4 proximate to a manual starter, inserting a segment of the pull cord 4 into the open end 141 of the V-notch 14 and pressing this segment of the pull cord 4 into the tapered end 142 of the V-notch 14. The tapered end 142 of the V-notch 14 applies a pinching force on the inserted segment of the pull cord 4, such that the sheath 8 is prevented from sliding along the length of the pull cord 4. In this state, with the pull cord 4 retracted and the tool holder sheath 8 fixed proximate to the manual starter, via the V-notch 14, a rewind mechanism of the manual starter is prevented from drawing in the pull cord 4. Consequently, a range of motion is supplied to a tool holder, fixed to an end of the pull cord 4.

Figures 15, 16:
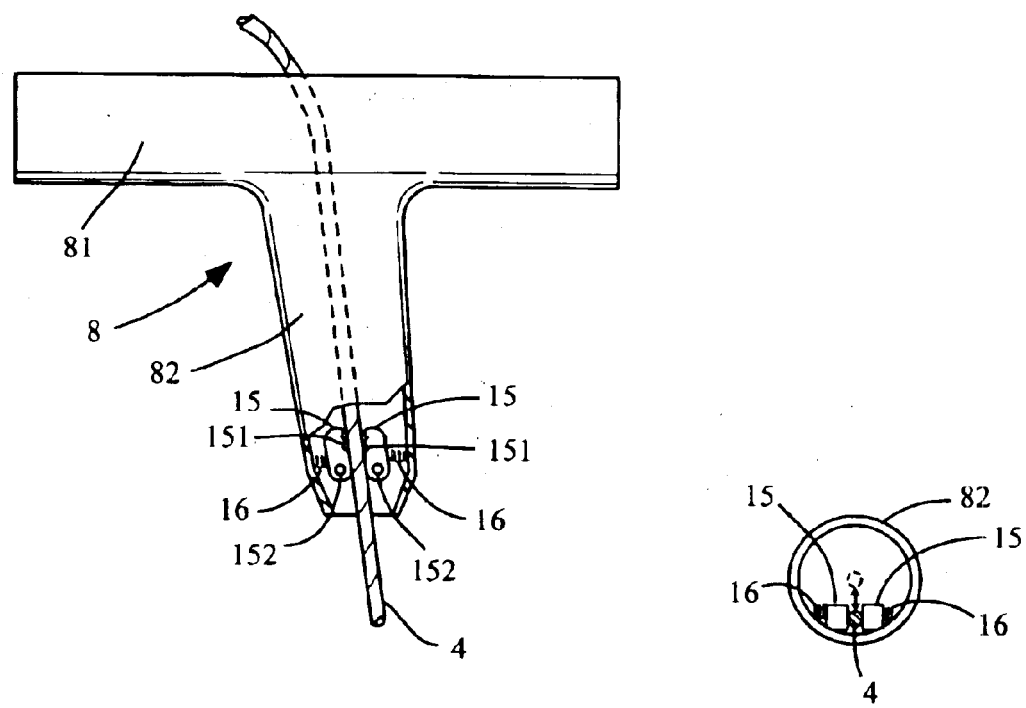
FIG. 15 is a depiction in front view of another embodiment of the tool holder sheath of FIG. 14, including a cord locking means having a pair of bodies having a plurality of teeth.
FIG. 16 is an illustration in end view of the tool holder sheath of FIG. 15, including a cord locking means having a pair of bodies having a plurality of teeth.

Focusing now on FIGS. 15 and 16, a cord lock embodiment comprised of a pair of bodies 15 having a plurality of teeth 151 is illustrated. Shown are a tool holder sheath 8 having receptacle 81 and shaft 82 segments, a pair of bodies 15 having a plurality of teeth 151, pivot axes 152, coil springs 16, and a pull cord 4. The pivot axes 152 are fixed parallel to each other in the inner surface of the tool holder sheath's shaft 82. A pair of bodies 15 are pivotally mounted on the pivot axes 152. A surface of each body 15 contains a plurality of teeth 151, and the bodies 15 are mounted on the pivot axes 152 so that the surfaces having a plurality of teeth 151 are opposed and are spaced by a distance sufficient for receiving the pull cord 4. A coil spring 16 is positioned between the inner surface of the shaft 82 and each body 15, whereby a coil spring 16 engages a body 15 exerting a lateral force that causes, a body 15 to pivot about the pivot axis 152 toward an opposing body 15.

An operator can insert a segment of the pull cord 4 between the bodies 15 by pulling the pull cord 4 sideways towards the side of the shaft 82 where the bodies 15 are pivotally mounted, as illustrated in the end view of the shaft 82 shown in FIG. 16. When the pull cord 4 is inserted between the bodies 15, the lateral force exerted by the coil springs 16 on the bodies 15 cause the plurality of teeth 151 to forcibly engage the pull cord 4, creating an applied compressive force on the pull cord 4, which prevents the tool holder sheath 8 from sliding along the length of the pull cord 4. Consequently, after retracting the pull cord 4, sliding the sheath 8 down the length of the pull cord 4 adjacent to a manual starter, and inserting the pull cord 4 between the bodies 15, the rewind mechanism of a manual starter will be prevented from drawing in the pull cord 4. Subsequently, a tool holder of the present invention that is fixed to the pull cord 4 may be used to service a power-operated device.

Figure 17:
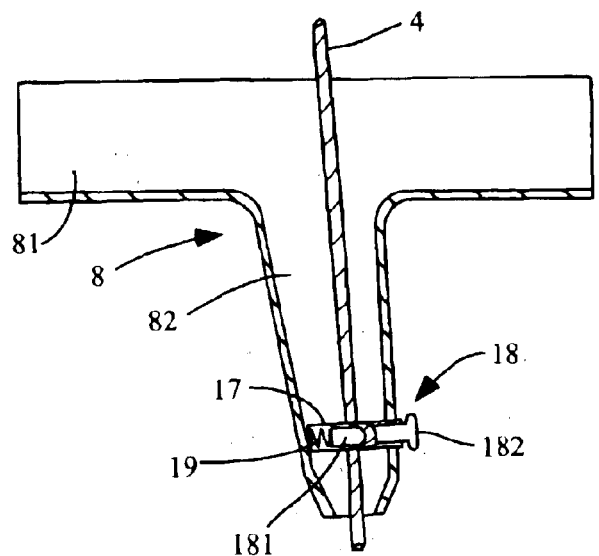
FIG. 17 is an illustration of yet a further embodiment of the tool holder sheath of FIG. 14 in front cross section, which contains a cord locking means comprised of a spring and piston assembly.

Turning to FIG. 17, shown is an embodiment of a cord locking means comprised of a piston 18 and coil spring 19 assembly. Detailed are a tool holder sheath 8 having receptacle 81 and shaft 82 segments, a hollow cylinder 17, a piston 18 having a shaft 181 and flat head 182, a coil spring 19, and a pull cord 4. In the embodiment depicted in FIG. 17, the shaft 82 of the tool holder sheath 8 has a hole in one side. The hollow cylinder 17 has an open end, and is arranged horizontally in the shaft 82 with its open end aligned on the hole in the side of the shaft 82. Piston shaft 181 is positioned within the hollow cylinder 17 and the piston head 182 is external to the sheath 8. The hollow cylinder 17 has two opposing holes aligned on its surface, which are roughly the circumference of pull cord 4. Additionally, the piston shaft 181 has a conduit through its midsection, also roughly the circumference of pull cord 4. The holes in the surface of the hollow cylinder 17 in conjunction with the conduit through the piston shaft 181, allow the pull cord 4 to run through the present embodiment of the cord lock.

The coil spring 19 is positioned between the closed end of the hollow cylinder 17 and the end of the piston shaft 181, whereby a moving force is exerted on the piston 18. In steady state, as shown in FIG. 17, the coil spring 19 exerts a lateral force on the end of the piston shaft 181 causing misalignment of the openings to the conduit in the piston shaft 181 and the holes in the hollow cylinder 17. Consequently, a pinching force is applied on the segment of the pull cord 4 in the piston shaft's 181 conduit, and the pull cord 4 is prevented from sliding through the conduit in the piston shaft 181. As a result, the sheath 8 is fixed to a segment of the pull cord 4. To counter-act the lateral force applied to the piston shaft 181 and unfix the sheath 8, an operator can depress the piston head 182, aligning the holes in the hollow cylinder 17 with the openings of the conduit in the piston shaft 181, allowing the pull cord 4 to slide freely through. By depressing the piston head 182 and subsequently sliding the sheath 8 down the length of a retracted pull cord 4 proximate to a manual starter, an operator can lock the pull cord 4 in a retracted state, and a tool holder of the present invention may be used to service a power-operated device.

Figure 18:
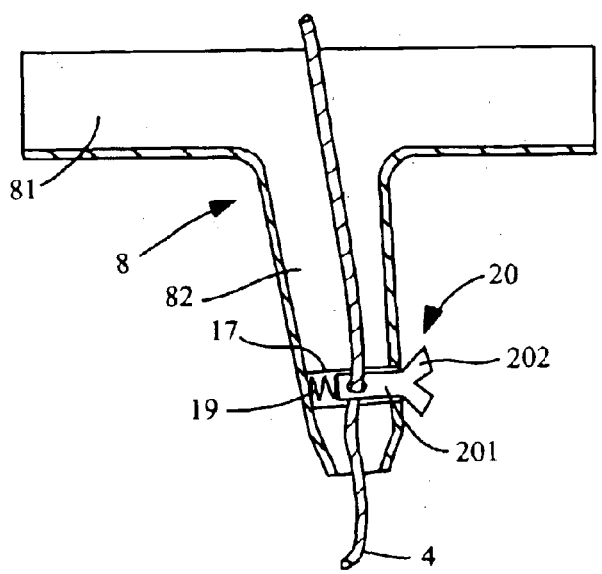
FIG. 18 is a diagram of another further embodiment of the tool holder sheath of FIG. 14 in front cross section, which contains a cord locking means comprised of a spring and winged piston assembly.
Figure 19:
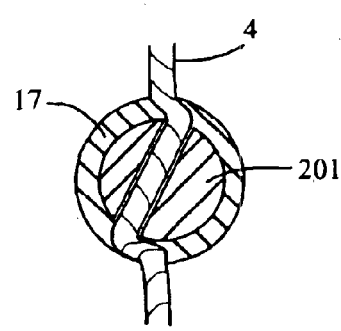
FIG. 19 is a drawing of the cord locking means of FIG. 18 in end perspective, showing the winged piston in cross section.

In FIGS. 18 and 19 an alternative embodiment of a cord locking means comprised of a winged piston 20 and coil spring 19, assembly, is taught. Detailed are a tool holder sheath 8 having receptacle 81 and shaft 82 segments, a hollow cylinder 17, a winged piston 20 having a shaft 201 and winged head 202, a coil spring 19, and a pull cord 4. In the embodiment depicted in FIG. 18, the shaft 82 of tool holder sheath 8 has a hole in one side. Hollow cylinder 17 has an open end, and is arranged horizontally in the shaft 82 with its open end aligned on the hole in the side of shaft 82. Piston shaft 201 is positioned within hollow cylinder 17 and winged piston head 202 is external to the sheath 8. The hollow cylinder 17 has two opposing holes, roughly the circumference of the pull chord 4, aligned on its surface. Similarly, a portion of the piston shaft 201 has a conduit through its midsection, also having roughly the circumference of the pull cord 4. The holes in the surface of the hollow cylinder 17 in conjunction with the conduit through the piston shaft 201, allow the pull cord 4 to run through the present embodiment of the cord lock.

An end of the coil spring 19 is permanently fixed to the closed end of the hollow cylinder 17, and the other end of coil spring 19 is permanently fixed to the end of the piston shaft 201, whereby a moving force is exerts on the winged piston 20. FIG. 19, depicting a cross section of the hollow cylinder 17 and the piston shaft 201, shows the piston shaft 201 as it would be positioned when the coil spring 19 is in steady state. In steady state the coil spring 19 exerts a rotating force on the end of the piston shaft 201 causing misalignment of the openings to the conduit in the piston shaft 181 and the holes in hollow cylinder 17. Consequently, a pinching force is applied on the segment of pull cord 4 that runs through the conduit in the piston shaft 201, and the pull cord 4 is prevented from sliding through this conduit. As a result, the sheath 8 is fixed to a section of the, pull cord 4. By turning the winged piston head 202, an operator can counter-act the torque applied to the piston shaft 201 and align the holes in the hollow cylinder 17 with the openings to the conduit in the piston shaft 201, permitting the pull cord 4 to slide freely through. By turning the winged piston head 202 and subsequently sliding the sheath 8 down the length of a retracted pull cord 4 proximate to a manual starter, an operator can lock the pull cord 4 in a retracted state, and a tool holder of the present invention may be used to service a power-operated device.

Turning now to FIG. 20 through 23, different tool holder and sheath embodiments are shown incorporated with a mechanism for reducing the recoil of a manual starter.

Figure 20:
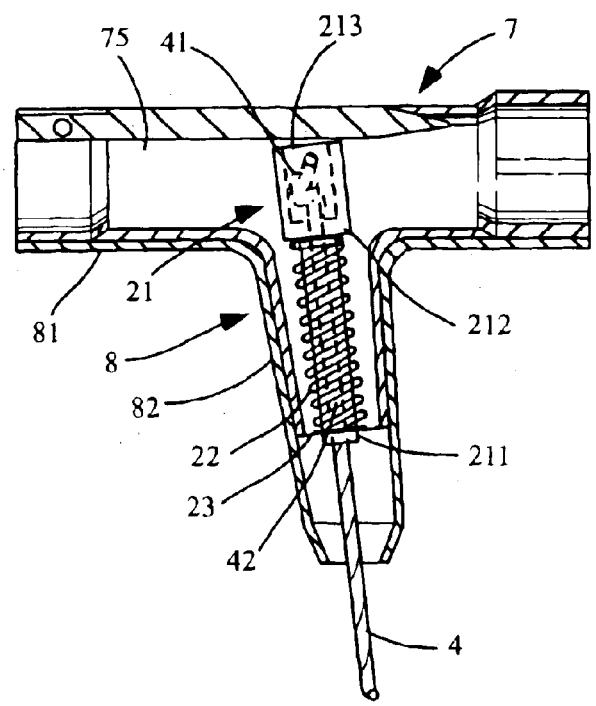
FIG. 20 is a depiction in front cross section, of a further embodiment of the further embodiment of tool holder of FIG. 1 and sheath, wherein the sheath has a recoil reducing means, shown in steady state, comprised of a spring and hollow piston assembly.
Figure 21:
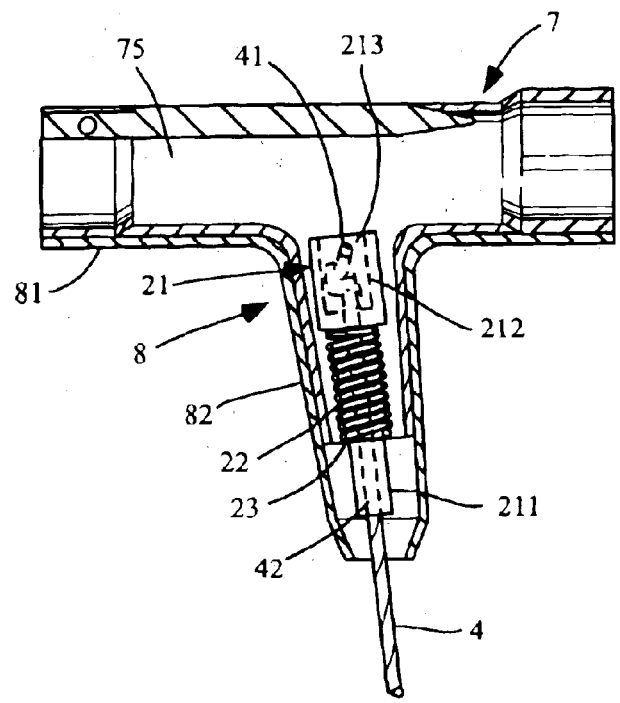
FIG. 21 is a depiction in front cross section, of the further embodiment of the tool holder of FIG. 20 and sheath of FIG. 20, with the recoil reducing means shown in a recoil reducing state.

Focusing first on FIGS. 20 and 21 a recoil reducing mechanism comprised of a coil spring 22 and hollow piston 21 assembly is shown incorporated into a tool holder 7. Detailed are a tool holder 7, a cavity 75, a tool holder sheath 8 having receptacle 81 and shaft 82 segments, a hollow piston 21 having a shaft 211 and head 212, a coil spring 22, a washer 23, a pull cord 4, coupling means 41, and a pull cord conduit 42. The present embodiment of the tool holder 7 has a cavity 75 having a hole at its base. The cavity 75 houses the hollow piston 21 and coil spring 22 assembly comprising the recoil reducing mechanism. Piston shaft 211 has a void throughout, which forms a conduit 42 through which the pull cord 4 runs. Piston head 212 is hollow and contains the coupling means 41 at the end of the pull cord 4, permanently coupling the pull cord 4 and the tool holder 7. The coupling means 41 depicted in FIGS. 20 and 21 is a knot. A coil spring 22 and washer 23 are disposed around the piston shaft 211. An end of the coil spring 22 engages the base of the piston head 212 and the other end engages the washer 23, which is centered on the hole in the base of tool holder cavity 75. Piston shaft 211 and the segment of the pull cord 4 contained therein., pass freely through the hole in the base of tool holder cavity 75. When the coil spring 22 is in steady state, as shown in FIG. 20, it retracts the piston 21 into the cavity 71.

When an operator pulls on the tool handle 7 to retract the pull cord 4 this force is opposed by a manual starter's rewind mechanism coupled to the opposite end of the pull cord 4. This applied pulling force exerted by the operator creates an increased tension on the pull cord 4, causing the piston 21 to move downward. Consequently, a segment of the piston shaft 211 will pass through the hole in the base of the tool holder cavity 75. FIG. 21 illustrates the state of the recoil mechanism when the tension in the pull cord is increased. As depicted, the downward movement of the piston exerts a force that causes the coil spring 22 to compress. This piston 21 movement and subsequent compression of the coil spring 22 dissipates a majority of the opposing force created by the manual starter's rewind mechanism, effectively making the retraction of the pull cord 4 easier for the operator.

Figure 22:
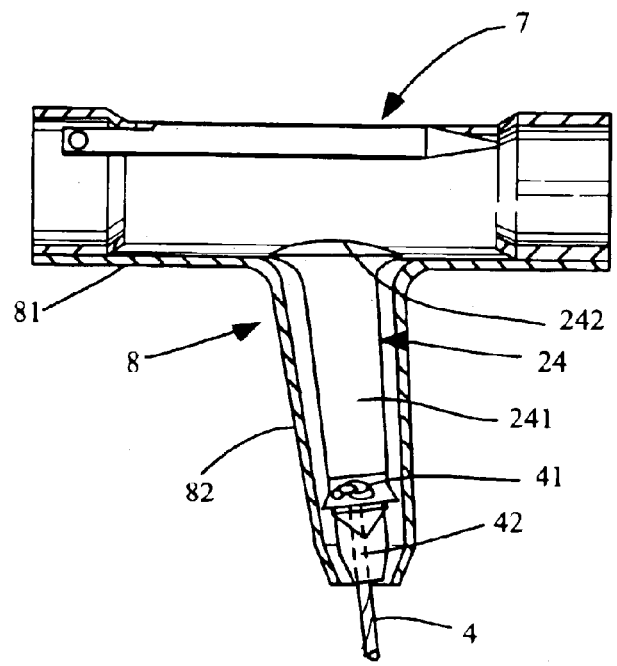
FIG. 22 is an illustration in front cross section of an additional embodiment of the tool holder of FIG. 1 and sheath, wherein the tool holder has a recoil reducing means, shown in steady state, comprised of a deformable body that stretches.
Figure 23:
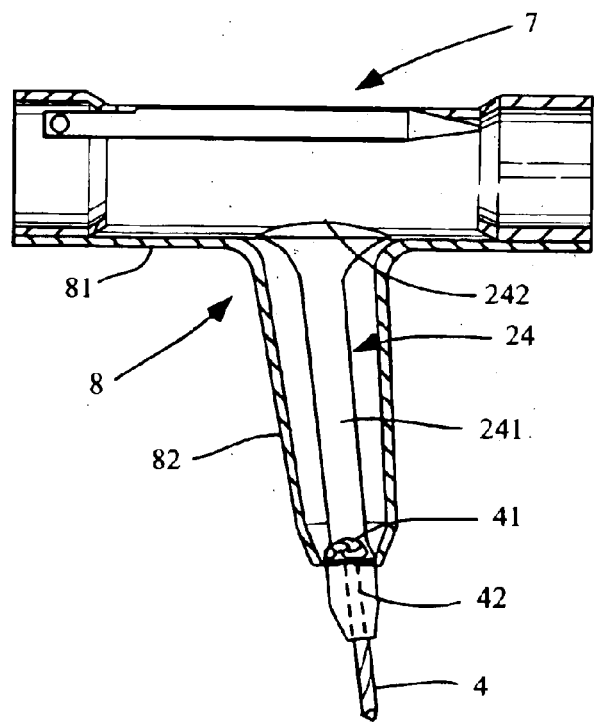
FIG. 23 is an illustration in front cross section, of the additional embodiment of the tool holder of FIG. 22 and sheath of FIG. 22, with the recoil reducing means, shown in a recoil reducing state.

Looking now to FIGS. 22 and 23, an alternative embodiment of a recoil reducing mechanism comprised of a deformable body integrated into a tool holder 7 is depicted. Detailed are the tool holder 7, a tool holder sheath 8 having receptacle 81 and shaft 82 segments, a deformable body 24 having a shaft 241 and head 242, a pull cord 4, a coupling means 41, and a pull cord conduit 42. Deformable body 24 is made of a composite material having elastic qualities, whereby an applied pulling force on an end of the body will cause the body to stretch and the body will return to original form after the cessation of that applied force. The deformable body's head 242 is fixed permanently within the base of the tool holder 7 and the deformable body's shaft 241 passes through an opening at the base of the tool holder 7. A void exist in the lower segment of the deformable body's shaft 241 forming a conduit 42 through which the pull cord 4 passes. A coupling means, demonstrated as a knot 41 at the end of pull cord 4, is disposed in the deformable body's shaft 241 at the top of the pull cord conduit 42. FIG. 22 illustrates the tool holder 7 and deformable body 24 in an un-stretched state.

When an operator pulls on the tool handle 7 to retract the pull cord 4 this force is opposed by a manual starter's rewind mechanism coupled to the opposite end of the pull cord 4. FIG. 23 illustrates the effects that a pulling force on the tool holder 7 has on the deformable body 24. As depicted, the pulling force and increased tension on the pull cord 4 causes the deformable body's shaft 241 to stretch. The stretching of the deformable body's shaft 241 effectively dissipates a majority of the opposing force created by the manual starter's rewind mechanism, making the retraction of the pull cord 4 easier for an operator.

While particular embodiments of the tool holder and cord locking means have been described and illustrated herein, it will be appreciated that various alternative embodiments encompassing changes and modifications may be contemplated by those skilled in the art, it is intended therefore that the appended claims cover all such changes and modifications which fall within the scope of the present invention. All references cited herein are incorporated by references.

What is claimed is:

1. An apparatus for servicing a power-operated device, comprising:
   a tool holder, permanently coupled to a retractable pull cord, said retractable pull cord incorporated into a manual starter of said power-operated device; and
   at least one service tool coupled to said tool holder; and
   means for locking said retractable pull cord in a retracted state.

2. The apparatus as recited in claim 1, wherein at least one end of said tool holder forms a socket wrench.

3. The apparatus as recited in claim 1, wherein at least one end of said tool holder has an open cavity for receiving a socket wrench insert.

4. The apparatus as recited in claim 1, wherein at least one end of said tool holder has a notch.

5. The apparatus as recited in claim 1, wherein said at least one service tool is pivotally mounted on said tool holder.

6. The apparatus as recited in claim 5, wherein said at least one service tool is any of the group consisting of a screwdriver, a wrench, a file, a knife, a feeler gauge, a brush, and a pick.

7. The apparatus as recited in claim 1, wherein said means for locking said retractable pull cord further comprises:
   a first hollow body having an open end;
   a second body movably disposed in said first body;
   a coil spring positioned between said first body and said second body, whereby a moving force is exerted on said second body, and wherein said retractable pull cord passes through a conduit in said first and said second bodies.

8. The apparatus as recited in claim 7, wherein said moving force exerted on said second body is causing any of the group consisting of lateral movement and rotating movement.

9. An apparatus for servicing a power-operated device, comprising:
   a tool holder, permanently coupled to a retractable pull cord, said retractable pull cord incorporated into a manual starter of said power-operated device;
   at least one service tool coupled to said tool holder; and
   a sheath for receiving said tool holder; and
   a means for locking said retractable pull cord in a retracted state.

10. The apparatus as recited in claim 9, wherein at least one end of said tool holder forms a socket wrench.

11. The apparatus as recited in claim 9, wherein at least one end of said tool holder has an open cavity for receiving a socket wrench insert.

12. The apparatus as recited in claim 9, wherein at least one end of said tool holder has a notch.

13. The apparatus as recited in claim 9, wherein said at least one service tool is pivotally mounted on said tool holder.

14. The apparatus as recited in claim 13, wherein said at least one service tool is any of the group consisting of a screwdriver, a wrench, a file, a knife, a feeler gauge, a brush, and a pick.

15. The apparatus as recited in claim 9, wherein said means for locking said retractable pull cord is a V-shaped notch in said sheath.

16. The apparatus as recited in claim 9, wherein said means for locking said retractable pull cord further comprises:
   a first and a second pivot axis fixed in a side of said sheath, said second pivot axis parallel to said first pivot axis; and
   a first body having a plurality of teeth, said first body pivotally mounted on said first pivot axis; and
   a second body having a plurality of teeth, said second body pivotally mounted on said second pivot axis, said plurality of teeth of said second body opposing said plurality of teeth of said first body; and
   a first coil spring positioned between said first body and said sheath, whereby a lateral force is exerted on said first body, toward said second body; and
   a second coil spring positioned between said second body and said sheath, whereby a lateral force is exerted on said second body, toward said first body.

17. The apparatus as recited in claim 9, wherein said means for locking said retractable pull cord further comprises:
   a first hollow body having an open end, said hollow body positioned in said sheath;
   a second body movably disposed in said first body;
   a coil spring positioned between said first body and said second body, whereby a moving force is exerted on said second body, and wherein said retractable pull cord passes through a conduit in said first and said second bodies.

18. The apparatus as recited in claim 17, wherein said moving force exerted on said second body is causing any of the group consisting of lateral movement and rotating movement.

19. An apparatus for servicing a power-operated device, comprising:
   a tool holder, permanently coupled to a retractable pull cord, said retractable pull cord incorporated into a manual starter of said power-operated device;
   at least one service tool coupled to said tool holder;
   means for reducing the recoil of said manual starter, said recoil reducing means coupled to said tool holder; and
   a sheath for receiving said tool holder; and
   means for locking said retractable pull cord in a retracted state.

20. The apparatus as recited in claim 19, wherein at least one end of said tool holder forms a socket wrench.

21. The apparatus as recited in claim 19, wherein at least one end of said tool holder has an open cavity for receiving a socket wrench insert.

22. The apparatus as recited in claim 19, wherein at least one end of said tool holder has a notch.

23. The apparatus as recited in claim 19, wherein said at least one service tool is pivotally mounted on said tool holder.

24. The apparatus as recited in claim 23, wherein said at least one service tool is any of the group consisting of a screwdriver, a wrench, a file, a knife, a feeler gauge, a brush, and a pick.

25. The apparatus as recited in claim 19, wherein said means for reducing the recoil of said manual starter further comprises:
   a deformable body partially disposed in said tool holder wherein said pull cord is permanently coupled to said deformable body and whereby an increase in tension on said pull cord will cause said deformable body to stretch in the direction of said tension.

26. The apparatus as recited in claim 19, wherein said means for reducing the recoil of said manual starter further comprises:
   a cylindrical body movably disposed in said tool holder;
   a coil spring surrounding a segment of said cylindrical body and contained within said tool holder wherein said pull cord is permanently coupled to said cylindrical body and whereby an increase in tension on said pull cord will cause said cylindrical body to move in the direction of said tension.

27. The apparatus as recited in claim 19, wherein said means for locking said retractable pull cord is a V-shaped notch in said sheath.

28. The apparatus as recited in claim 19, wherein said means for locking said retractable pull cord further comprises:

a first hollow body having an open end;

a second body movably disposed in said first body;

a coil spring positioned between said first body and said second body, whereby a moving force is exerted on said second body, and wherein said retractable pull cord passes through a conduit in said first and said second bodies.

29. The apparatus as recited in claim 28, wherein said moving force exerted on said second body is causing any of the group consisting of lateral movement and rotating movement.

* * * * *